(12) United States Patent
Kolobov et al.

(10) Patent No.: US 11,379,539 B2
(45) Date of Patent: Jul. 5, 2022

(54) EFFICIENT FRESHNESS CRAWL SCHEDULING

(71) Applicant: MICROSOFT TECHNOLOGY LICENSING, LLC, Redmond, WA (US)

(72) Inventors: Andrey Kolobov, Bellevue, WA (US); Cheng Lu, Kirkland, WA (US); Eric J. Horvitz, Redmond, WA (US); Yuval Peres, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 161 days.

(21) Appl. No.: 16/419,985

(22) Filed: May 22, 2019

(65) Prior Publication Data

US 2020/0372084 A1    Nov. 26, 2020

(51) Int. Cl.
  *G06F 15/16*   (2006.01)
  *G06F 16/951*  (2019.01)
  *G06F 9/48*    (2006.01)

(52) U.S. Cl.
  CPC .......... *G06F 16/951* (2019.01); *G06F 9/4881* (2013.01)

(58) Field of Classification Search
  None
  See application file for complete search history.

(56) References Cited

U.S. PATENT DOCUMENTS

| | | | |
|---|---|---|---|
| 7,310,632 B2 | 12/2007 | Meek et al. | |
| 7,725,452 B1 | 5/2010 | Randall | |
| 7,769,742 B1 | 8/2010 | Brawer et al. | |
| 7,774,782 B1* | 8/2010 | Popescu | H04L 67/1002 709/202 |
| 9,213,780 B2 | 12/2015 | Azar et al. | |
| 2004/0044962 A1 | 3/2004 | Green et al. | |
| 2011/0320428 A1* | 12/2011 | Erera | G06F 16/951 707/711 |
| 2013/0212100 A1* | 8/2013 | Hajaj | G06F 16/951 707/736 |
| 2017/0116653 A1* | 4/2017 | Smith | G06Q 10/06 |

OTHER PUBLICATIONS

"International Search Report and Written Opinion Issued in PCT Application No. PCT/US2020/023056", dated May 29, 2020, 14 Pages.

* cited by examiner

*Primary Examiner* — Alex Gofman
(74) *Attorney, Agent, or Firm* — Shook, Hardy & Bacon, LLP

(57) ABSTRACT

The technology described herein builds an optimal refresh schedule by minimizing a cost function constrained by an available refresh bandwidth. The cost function receives an importance score for a content item and a change rate for the content item as input in order to optimize the schedule. The cost function is considered optimized when a refresh schedule is found that minimizes the cost while using the available bandwidth and no more. The technology can build an optimized schedule to refresh content with incomplete change data, content with complete change data, or a mixture of content with and without complete change data. It can also re-learn content item change rates from its own schedule execution history and re-compute the refresh schedule, ensuring that this schedule takes into account the latest trends in content item updates.

17 Claims, 8 Drawing Sheets

800

810

DETERMINE A CRAWL PROBABILITY VECTOR THAT COMPRISES AN INDIVIDUAL CRAWL PROBABILITY FOR EACH INDIVIDUAL CONTENT ITEM IN THE CONTENT SET, WHEREIN THE INDIVIDUAL CRAWL PROBABILITY IS USED TO DETERMINE WHETHER TO CRAWL AN ASSOCIATED INDIVIDUAL CONTENT ITEM UPON RECEIVING A CHANGE NOTIFICATION FOR THE ASSOCIATED INDIVIDUAL CONTENT ITEM

820

OUTPUT A CRAWL PROBABILITY VECTOR COMPRISING THE INDIVIDUAL CRAWL PROBABILITY FOR EACH INDIVIDUAL CONTENT ITEM

*FIG. 8.*

EFFICIENT FRESHNESS CRAWL SCHEDULING

BACKGROUND

A Web crawler is a typical part of a search engine that procures information subsequently served by the search service to its users. As the Web is becoming increasingly more dynamic, in addition to discovering new web pages, a crawler needs to keep revisiting those already in the search engine's index, in order to keep the index fresh by picking up the pages' changed content. This refresh process is resource intensive.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technology described herein provides a more efficient crawl schedule for content trackers, such as search engines, to use when refreshing a content index. As the Web becomes more dynamic, services that rely on Web data face the increasingly challenging problem of keeping up with content changes. Whether it be a continuous-query system, a virtual assistant, or an Internet search engine, such a service tracks many remote sources of content—web pages or data streams. Users expect trackers to surface the latest content that appears at the sources. For all content sources a tracker monitors, the tracker decides when to re-request (crawl) the content source in order to refresh the content in view of changes made since the last time the content was crawled. A policy that makes these crawl decisions well solves a freshness crawl scheduling problem.

The technology described herein is a holistic approach to freshness crawl scheduling that is computationally efficient and generates optimal freshness results using a type of reinforcement learning. In the ideal world, the search engine would revisit the content source as soon as the content changes. As a practical matter, this is often not technologically possible: most content sources, e.g., web pages, don't notify search engines when their content changes Even if they did, network bandwidth constraints would prevent the search engine's crawler from updating content upon every change notification. The goal is to find the optimal times to revisit these content sources while taking the overall available bandwidth into consideration, along with an estimated change rate for the content sources, the importance of the content sources, and the change notifications received.

At a high level, the technology described herein builds an optimal refresh schedule by minimizing a cost function that characterizes penalties a search engine incurs for staleness, i.e., the lack of freshness of its index, constrained by an available refresh bandwidth. The cost function takes into account a search-engine-defined importance score for a content item and a change rate of the content item as input in order to optimize the schedule. The optimization problem is solved when a refresh schedule is found that minimizes the cost while using the available bandwidth and no more. The optimal refresh schedule, sometimes described herein as a refresh policy, allocates an amount of available bandwidth to each content item in a set to be refreshed. In sum, the bandwidth allocated to each item within the set is less than or equal to the available bandwidth.

The optimal schedule created using the technology described herein will maximize overall item freshness. Both the change rate of a content item and an importance score for the content item are used to allocate bandwidth. It is also a feature of the technology described herein that all of the content items in a set to be refreshed will be allocated at least some bandwidth during a time horizon covered by the schedule.

The technology described herein can be optimized to build a refresh schedule for content items with different associated amounts of change data. The technology can build an optimized schedule to refresh content items with incomplete change data (when the search engine gets to observe an item from time to time and thereby detect changes, but doesn't know how many times the item changed in between observations), content items with complete change data (when the search engine gets notified every time when the content item changes), or a mixture of content items with and without complete change data. An optimized schedule is built by selecting differently parameterized cost functions for the different scenarios. In particular, the cost function used for sites with complete change data may depend on a probability of crawling in response to a change notification for the content site. In other words, the system may not crawl every content item every time a change notification is received. Instead, a probability is used to determine whether to visit the site, with different probability values translating to different values of the cost function. Conceptually, this can be imagined as flipping a coin to determine whether to visit the site when a change notification is received. Instead of the 50% probability associated with flipping a coin, the probability calculated for the item would be used to make the crawl or no crawl decision.

BRIEF DESCRIPTION OF THE DRAWINGS

The present disclosure is described in detail below with reference to the attached drawing figures, wherein:

FIG. 8 is a flow diagram that illustrates a method for preparing a crawl probability vector for a crawler to follow when seeking updated copies of content items, in accordance with aspects of the technology described herein.

DETAILED DESCRIPTION

Figure 1:
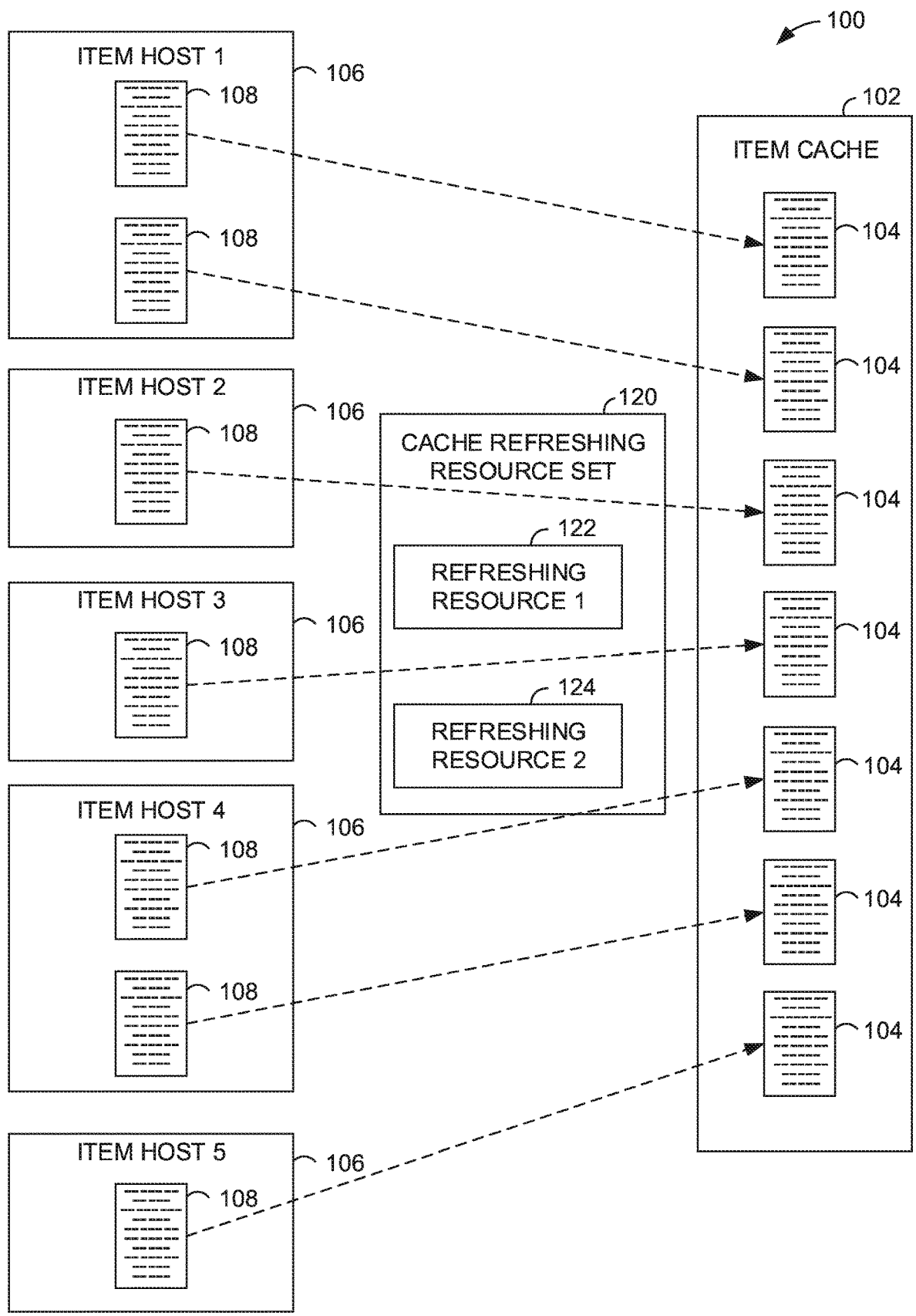
FIG. 1 is a block diagram illustrating the general process of refreshing a content index, in accordance with aspects of the technology described herein.

The subject matter of the present disclosure is described with specificity herein to meet statutory requirements. However, the description itself is not intended to limit the scope of this patent. Rather, the inventors have contemplated that the claimed subject matter might also be embodied in other ways, for other cost functions, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

The technology described herein provides a more efficient crawl schedule for content trackers, such as search engines, to use when refreshing a content index. As the Web becomes more dynamic, services that rely on Web data face the increasingly challenging problem of keeping up with content changes. Whether it be a continuous-query system, a virtual assistant, or an Internet search engine, such a service tracks many remote sources of content—web pages or data streams. Users expect trackers to surface the latest content that appears at the sources. For all content sources a tracker monitors, the tracker decides when to re-request (crawl) the content source in order to refresh the content in view of changes made since the last time the content was crawled. A policy that makes these crawl decisions well solves a freshness crawl scheduling problem.

Freshness crawl scheduling has several challenging aspects. For most content sources, the tracker finds out whether the content has changed only when it crawls the source. To guess when the changes happen, and hence should be downloaded, the tracker needs a predictive model whose parameters are initially unknown. Thus, the tracker needs to learn these models and optimize a freshness-related objective when scheduling crawls. For some web pages, however, sitemap polling and other means can provide trustworthy near-instantaneous signals that the page has changed in a meaningful way, though not what the change is exactly. But even with these remote change observations and known change model parameters, freshness crawl scheduling remains highly nontrivial because the tracker cannot react to every individual predicted or actual change. The tracker's infrastructure imposes a bandwidth constraint on the average daily number of crawls, usually limiting it to a fraction of the change event volume.

The technology described herein is a holistic approach to freshness crawl scheduling that is computationally efficient and generates optimal freshness results using a type of reinforcement learning. In the ideal world, the search engine would revisit the content source as soon as the content changes. As a practical matter, this is often not technologically possible: most content sources, e.g., web pages, don't notify search engines when their content changes Even if they did, network bandwidth constraints would prevent the search engine's crawler from updating content upon every change notification. The goal is to find the optimal times to revisit these content sources while taking the overall available bandwidth into consideration, along with an estimated change rate for the content sources, the importance of the content sources, and the change notifications received.

At a high level, the technology described herein builds an optimal refresh schedule by minimizing a cost function that characterizes penalties a search engine incurs for staleness, i.e., the lack of freshness of its index, constrained by an available refresh bandwidth. The cost function takes into account a search-engine-defined importance score for a content item and a change rate of the content item as input in order to optimize the schedule. The optimization problem is solved when a refresh schedule is found that minimizes the cost while using the available bandwidth and no more. The optimal refresh schedule, sometimes described herein as a refresh policy, allocates an amount of available bandwidth to each content item in a set to be refreshed. In sum, the bandwidth allocated to each item within the set is less than or equal to the available bandwidth.

The optimal schedule created using the technology described herein will maximize overall item freshness. It is also a feature of the technology described herein that all of the content items in a set to be refreshed will be allocated at least some bandwidth during a time horizon covered by the schedule. As will be described in more detail, it may be that an individual content item is not crawled during the time horizon, however, the plan allows the possibility that the content item could be crawled depending on events, such as receiving a change notification for the content item, that occur during the time horizon.

A key goal of the technology described herein is to generate an optimal refresh schedule. As used herein, an optimal refresh schedule maximizes the overall freshness of content items within a set to be refreshed. Further, the importance of an item is considered when assigning bandwidth. The importance score is used to define the importance of items. An item is stale, as used herein, when it has changed and not been crawled by the refresh process. Otherwise, the item is fresh if it has not changed since the last time the item was downloaded to a cache.

Optimization can be better understood in contrast to a non-optimal approach, such as evenly distributing crawl bandwidth across all items in a set. Taking just change frequency into account, an even distribution of crawl resources across items in the content set is not optimal because sites that change frequently would be crawled as frequently as sites that do not change frequently. Given an environment where bandwidth is limited, this means that frequently changing sites will likely be stale for a comparatively long time, while infrequently changing sites will be crawled multiple times before a change occurs. Thus, evenly distributing crawl opportunities will not maximize overall freshness. Other simple heuristics, such as distributing crawl opportunities in proportion to just change rate or importance score will also produce suboptimal results.

The cost function used with the technology described herein assigns the higher per-time-unit penalty to a content item the more times the content item has changed since it was last refreshed/crawled by the tracker. Thus, it penalizes the tracker for every change that happened at a source since the previous crawl, not just the first one. This may be described as a monotonically increasing penalty. In one aspect, the cost increase is not linear. Instead, a cost function is selected such that the cost increases at a decreasing rate as the number of unsynchronized changes at a content item increases. This reflects the intuition that while all undetected changes at a content item matter, the first one matters most, as it marks the transition from freshness to staleness. Thus, in one aspect, the cost function related to change rate is both monotonically increasing and discrete-concave, providing diminishing penalty increases over time.

The importance score is also used to optimize the schedule. The importance score assigned to a content item can take many forms and can be built taking various characteristics as input. For example, a spam score can be an input to the importance score. Web traffic to a content item can be an input to the importance score with sites having high-traffic being more important. A click-through rate on search results can be another factor with a high click-through rate resulting in a higher importance score. Similarly, a higher query frequency can result in a higher importance score. In one aspect, various content items are already assigned an importance score (even if not called an importance score) by a search engine or other service and this score may be used by aspects of the technology either as the importance score or as a component of a new score. In one method, the different factors are given different weights to produce the importance score. In an aspect, the importance score is greater than zero, as using zero within the cost function would result in zero cost for not visiting the content item. Zero cost would likely result in zero scheduled crawls for the item, which is inconsistent with a goal of the technology described herein. If a content item should not be refreshed, it would better to exclude it from the content set being evaluated.

A goal of the technology described herein is to build a refresh policy that does not starve any content item in the set to be refreshed. In other words, every item in the set should have the possibility of being crawled during a planning time covered by the refresh schedule. As described in more detail, the cost function takes change rate and an importance score as inputs. Aspects of the technology ensure that the refresh solution does not result in any content item having no probability of being crawled during the planning horizon.

In some situations, it may be desirable to exclude content items from being refreshed. For example, known spam pages may have zero importance and may be undesirable to refresh. Similarly, sites that are known not to change may also be excluded. This can be handled by not including the sites in a set of content items to be refreshed. As used herein, the set of content items need not include all known content items in a cache or index.

The technology described herein can be optimized to build a refresh schedule for content items with different associated amounts of change data. The technology can build an optimized schedule to refresh content items with incomplete change data (when the search engine gets to observe an item from time to time and thereby detect changes, but doesn't know how many times the item changed in between observations), content items with complete change data (when the search engine gets notified every time when the content item changes), or a mixture of content items with and without complete change data. An optimized schedule is built by selecting differently parameterized cost functions for the different scenarios. In particular, the cost function used for sites with complete change data may depend on a probability of crawling in response to a change notification for the content site. In other words, the system may not crawl every content item every time a change notification is received. Instead, a probability is used to determine whether to visit the site, with different probability values translating to different values of the cost function. Conceptually, this can be imagined as flipping a coin to determine whether to visit the site when a change notification is received. Instead of the 50% probability associated with flipping a coin, the probability calculated for the item would be used to make the crawl or no crawl decision. For example, a random number generator could be used to generate a number between 1 and 100 every time a change notification is received for a content item. A 0.6 crawl probability could be implemented by crawling the content item when the randomly generated number is less than or equal to 60.

A content item has complete change data when nearly instantaneous change notifications are received whenever the content item changes. Change data may be obtained by leveraging telemetry signals from users visiting different content. For example, a web browser may provide webpage information to the tracker's a change analysis component. The web browser may be associated with the tracker. Web sites that are frequently visited may have complete change data provided by the browsers of the many visitors. Web sites themselves may maintain sitemap files that reliably log every change on the web site's pages and can be polled very frequently by the tracker in order to find out about these changes. A threshold may be used to determine what level of change information is needed to classify an item as having complete change information. The threshold may take both the analysis frequency and historical change frequency into account. Any content item that does not satisfy the complete-change threshold is classified as incomplete.

All of these topics will be explained in more detail subsequently, especially with reference to FIGS. 3-6. FIG. 1 offers an introduction to the concept of crawling and how a refresh schedule might be used, and FIG. 2 describes a suitable computing environment for the technology.

FIG. 1 presents an exemplary scenario 100 that generally illustrates these and other scenarios involving a set of cache items 104 stored in an item cache 102. The cache items 104 correspond to content items 108 retrieved from one or more content item hosts 106, and are stored in the item cache 102 in order to provide rapid access to a set of frequently requested content, for example, in response to queries. These queries may, e.g., be specific requests for the content items 108 hosted by the content item hosts 106, such as a URL identifying a particular web page or web resource, or may be a more general query that produces a search result set describing relevant content items 108. The result set may be stored as the item 104 in the item cache 102 and may be frequently updated based on changes to the content items 108 so queried.

As the content items 108 offered by the content item hosts 106 change over time, the items 104 in the item cache 102 have to be refreshed in order to avoid producing stale results referencing old versions of the content items 108. Therefore, a cache refreshing resource set 120 may be utilized to refresh the items 104 in the item cache 102. For example, the cache refreshing resource set 120 might comprise a first refreshing resource 122 and a second refreshing resource 124, each of which might comprise a process designed to refresh items 104 in the item cache 102. As one possible but inefficient example, the cache refreshing resources 122 might be configured to select an item 104 at random from the item cache 102, retrieve the corresponding content item 108 from the corresponding content item host 106, and compare the item 104 with the content item 108. If any differences are detected between the item 104 and the content item 108, the refreshing process may write the content item 108 over the stale version of the content item 108 stored in the item cache 102, thereby refreshing the item 104. This may be described as a crawl event. The time at which the crawl event occurred may be memorialized along with whether a change was detected in the content. This data can be used to determine a change rate for the content, as described subsequently.

In these and other scenarios, stale results, while not necessarily fatal to the operation of the item cache 102, are to be avoided by allocating cache refreshing resource set 120 in a manner that reduces the probability of serving an out-of-date item. For example, the cache refreshing resource set 120 may be allocated to refresh the items 104 in the item cache 102 based on various relevant factors. In one aspect, the first cache refreshing resource 122 may be responsible for refreshing a set of content items with limited real-time change data. The second cache refreshing resource 124 may be responsible for refreshing a set of content items with complete real-time change data. Each of the first cache refreshing resource 122 and the second cache refreshing resource 124 may have a designated amount of crawling bandwidth.

A cache refreshing policy may be selected in pursuit of many priorities, such as allocating resources to refresh the most frequently requested items 104, maximizing the percentage of fresh items 104 in the item cache 102, or most efficiently allocating the cache refreshing resource set 120, such that the requests are only issued for content items 108 that are most likely to have been updated since the last refresh of the corresponding item 104. Depending on the selected priorities and the comparative significance thereof, the strategy for refreshing the item cache 102 may be configured to allocate the cache refreshing resource set 120 that most efficiently promote these priorities, i.e., in order to achieve the most useful allocation of the cache refreshing resource set 120. Therefore, the refresh strategies utilized in these techniques may involve using the predicted query frequency and update frequency of respective items 104 in order to devise a refreshing policy that achieves a high refresh utility, according to the selected set of priorities and the comparative significance thereof.

Figure 2:
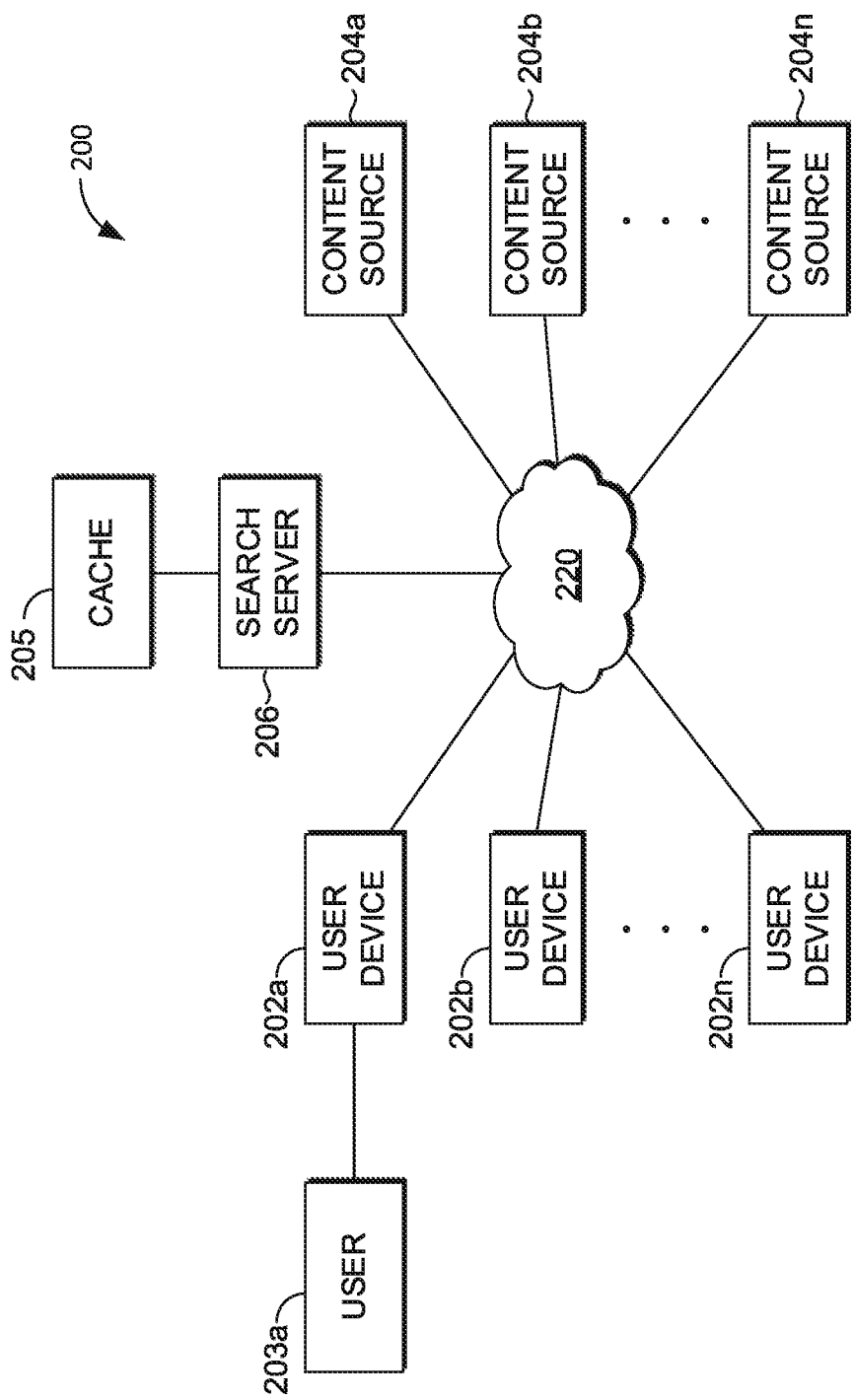
FIG. 2 is a block diagram of an exemplary computing environment suitable for use, in accordance with aspects of the technology described herein.

Turning now to FIG. 2, a block diagram is provided showing an operating environment 200 in which some embodiments of the present disclosure may be employed. It should be understood that this and other arrangements described herein are set forth only as examples. Other arrangements and elements (e.g., machines, interfaces, objective/cost functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 200 includes a number of user devices, such as user devices 202a and 202b through 202n; a number of content sources, such as content sources 204a and 204b through 204n; search server 206; cache 205; user 203a, and network 220. It should be understood that environment 200 shown in FIG. 2 is an example of one suitable operating environment.

Figure 7:
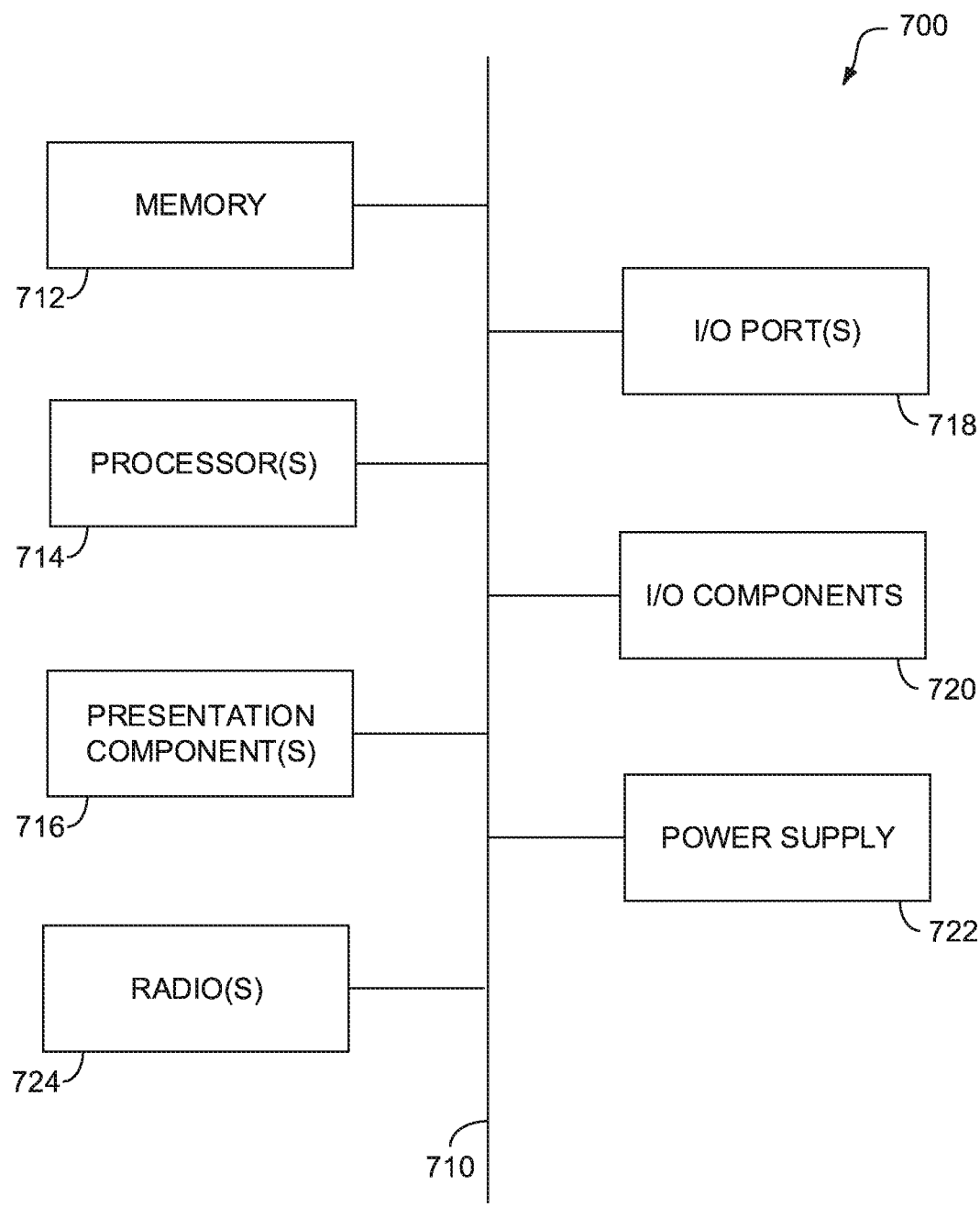
FIG. 7 is a block diagram that illustrates an exemplary computing device.

Each of the components shown in FIG. 2 may be implemented via any type of computing device, such as computing device 700, described in connection to FIG. 7, for example. These components may communicate with each other via network 220, which may include, without limitation, one or more local area networks (LANs) and/or wide area networks (WANs). In exemplary implementations, network 220 comprises the Internet and/or a cellular network, amongst any of a variety of possible public and/or private networks.

It should be understood that any number of user devices, servers, users, and content sources may be employed within operating environment 200 within the scope of the present disclosure. Each may comprise a single device or multiple devices cooperating in a distributed environment. For instance, search server 206 may be provided via multiple devices arranged in a distributed environment that collectively provide the functionality described herein. Additionally, other components not shown may also be included within the distributed environment.

User devices 202a and 202b through 202n may comprise any type of computing device capable of use by a user 203a. For example, in one embodiment, user devices 202a through 202n may be the type of computing device described in relation to FIG. 7 herein. By way of example and not limitation, a user device may be embodied as a personal computer (PC), a laptop computer, a mobile device, a smartphone, a tablet computer, a smart watch, a wearable computer, virtual reality headset, augmented reality headset, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 202a and 202b through 202n can be client devices on the client-side of operating environment 200, while search server 206 can be on the server-side of operating environment 200. Each user device 202a and 202b through 202n can be associated with one or more users, such as user 203a. Some user devices can be associated with multiple users, such as a family PC, game console, meeting room PC, electronic white board, and such. Similarly, a single user can be associated with multiple devices, including shared devices. A user sign-in identification can be used to determine the user operating a user device at a point in time and to associate actions taken with a user record. The user devices can submit queries and provide webpage summaries that can be used to detect changes upon navigating to a content item.

Content sources 204a and 204b through 204n may comprise content sources and/or content systems, which are configured to make content available to any of the various constituents of operating environment 200, or refresh scheduling environment 300 described in connection to FIG. 3. Content sources 204a and 204b through 204n may be web hosts. The search server 206 may store copies of content from the content sources in the cache 205.

Figure 3:
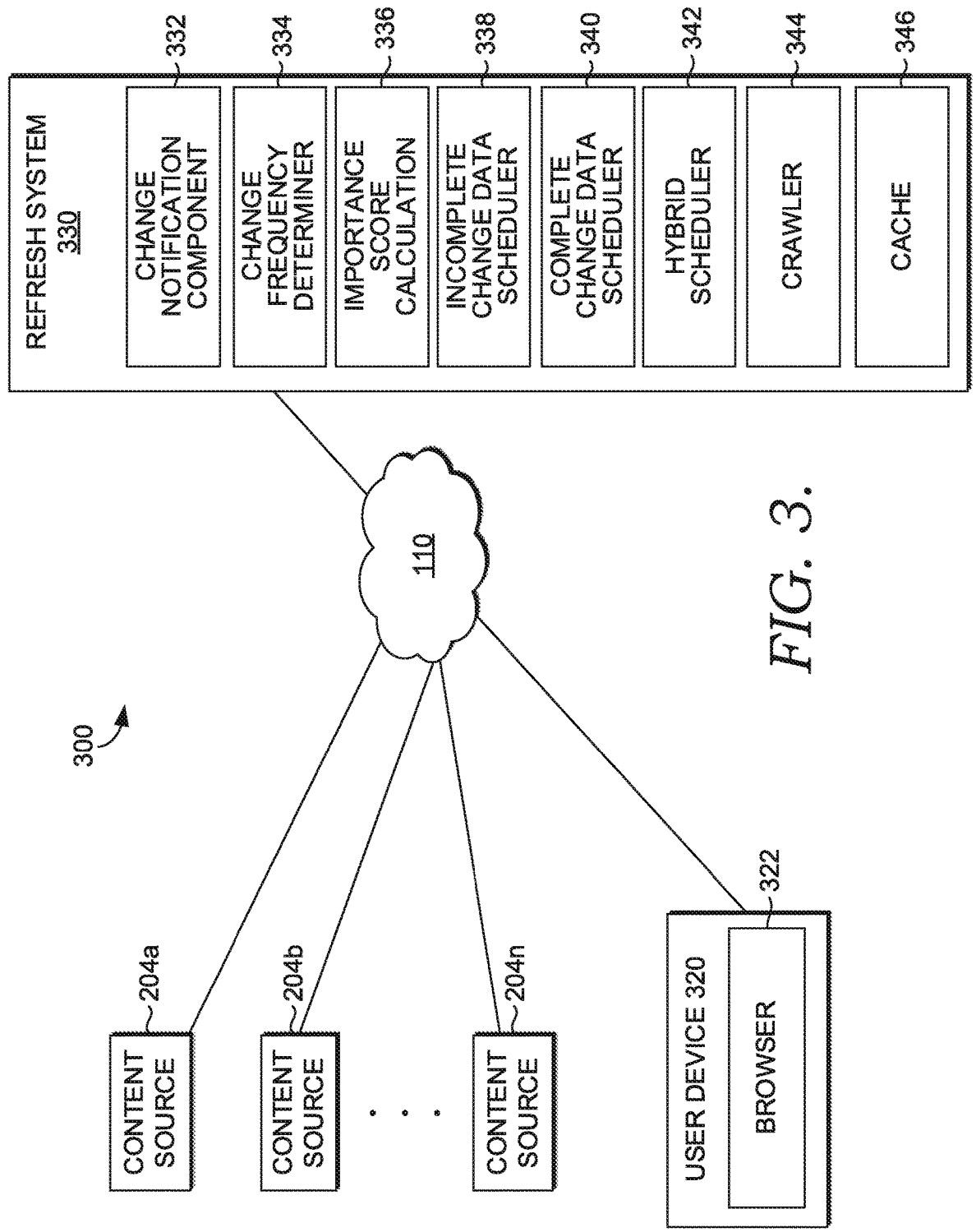
FIG. 3 is a block diagram illustrating an exemplary content refresh system, in accordance with aspects of the technology described herein.

Turning now to FIG. 3, a block diagram is provided illustrating an exemplary refresh scheduling environment 300 in which some embodiments of the present disclosure may be employed. The refresh scheduling environment 300 includes network 220, which is described in connection to FIG. 2, and which communicatively couples components of refresh scheduling environment 300. The components of refresh scheduling environment 300 may be embodied as a set of compiled computer instructions or functions, program modules, computer software services, or an arrangement of processes carried out on one or more computer systems, such as computing device 700 described in connection to FIG. 7, for example.

The components of the refresh scheduling environment 300 includes content sources 204a and 204b through 204n, user device 320, and the refresh system 330. The user device includes a browser 322 that includes a function to send change information to the change notification component 332. The refresh system 330 includes the change notification component 332, the change frequency determiner 334, the importance-score computation component 336, the incomplete change data scheduler 338, the complete change data scheduler 340, the hybrid scheduler 342, the crawler 344, and the content cache 346. Moreover, these components of FIG. 3, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in refresh scheduling environment 300, it is contemplated that in some embodiments, functionality of these components can be shared or distributed across other components.

The change notification component 332 identifies content changes by analyzing signals received from client devices or other sources. Some webpage changes can be detected apart from crawling. For example, the browser can catch a fingerprint of the content and provide this to the search engine. In this way, the search engine receives a stream of fingerprints. The fingerprints can be a hash of page content. If the page has not changed then the fingerprint will remain the same. On the other hand, if the page changed then the fingerprint will change. The search engine will then know the pages changed.

A browser (or other client side) function may provide a web page summary to a content change component that analyzes the summary to determine if a meaningful change occurred. The browser function detects the HTML sections of a web page, calculates a summary, such as a hash code for each section, and sends the information about the web page to the change component. The information submitted may include: the section hash codes, the URL of the web page, and the date and time of the access. If applicable, data from a "last modified" HTML tag may be provided. The summary may include information from the following parts of the web page: title, header, body and footer. The hash is then compared against previous hashes of the page/page sections. Changes in the hash reflect a change in the page.

In one aspect, a web host or other content source may provide a content update notification. It is often in the interest of content providers for search engines to have up to date content. When provided, this notification is considered a change confirmation. When a change is detected, a change notification may be communicated to the change notification component 332. A record of changes may be saved and used to calculate a change frequency for the item.

The change frequency determiner 334 calculates an estimated change rate for an individual content item. The estimated change rate may be calculated using a reinforcement learning methodology. The reinforcement learning methodology updates an estimated change rate using change observations obtained by crawling sources according to a refresh schedule obtained from the current change rate estimates. Although staleness minimization is efficient under the models described herein, in reality, actual change rates are usually unavailable and vary with time, requiring frequent relearning. An improved change rate estimation can result in an improved refresh schedule.

Suppose for a given source w the tracker has observed a sequence of binary change indicator variables $z_1, z_2, \ldots, z_U$, where $t_0, \ldots, t_U$ are times when the observations arrived, and, for $1 \leq j \leq U$, $z_j = 1$ if and only if the source changed compared to time $t_{j-1}$ at least once. Consider how changes can be detected when complete change information is available and when incomplete change information is available.

When incomplete change information is available for w, then the tracker crawls the content item to make a determination whether the individual content item changed between crawl events. After each crawl at time $t_1, \ldots, t_U$, the tracker checks for changes compared to the content item's previous crawl, and records $z_j = 1$ if the content is different or $z_j = 0$ is the content is the same. A change determination may be made by looking at the current content and/or structure of a content item in view of a previous version of the content item. For example, the text could be compared by isolating text in the content item, counting total characters in the text, and counting distinct characters in the text. When a change in the total characters or distinct characters occurs between different visits to the content item, then the content item is determined to have changed. There may be more than one change since the last crawl but the tracker cannot determine this. Denoting $a_j = t_j - t_{j-1}$, $j \geq 1$ the estimated change rate $\Delta$ solves to:

$$\sum_{j:z_j=1} \frac{a_j}{e^{a_j \Delta} - 1} - \sum_{j:z_j=0} a_j = 0 \quad (1)$$

Equation 1 is a maximum-likelihood estimator of the change rate for the given content item.

The second case occurs when complete change observations are available. As mentioned, change observations may be derived from browsers visiting the content item and sending back content information. In this case, for all j, $z_j = 1$, a change observation arrives only when there is a change and indicates exactly one change. The estimated change rate in this case can simply be the number of observed changes averaged over the observation time period from $t_0$ to $t_U$.

Once a change rate is estimated, they can be used to generate a new refresh schedule. The schedule can be followed and additional change observations gathered by following it can be added to the data set. Updated change rates can then be estimated.

The importance-score computation component 336 supplies importance scores to other components of the system. The importance score assigned to a content item can take many forms and can be built taking various characteristics as input. For example, a spam score can be an input to the importance score calculation. Web traffic to a content item can be an input to the importance score with sites having high traffic being more important. A click-through rate on search results can be another factor with a high click-through rate resulting in a higher importance score. Similarly, a higher frequency of queries to which a given content item is relevant can result in a higher importance score. In one aspect, various content items are already assigned an importance score (even if not called an importance score) by a search engine or other tracker, and this score may be used by aspects of the technology either as the importance score or as a component of a new score. In one method, the different factors are given different weights to produce the importance score. In an aspect, the importance score is greater than zero, as using zero within the cost function would result in zero cost for not visiting the content item. Zero cost would likely result in zero scheduled crawls for the item, which is inconsistent with a goal of the technology described herein. If a content item should not be refreshed, it would better to exclude it from the content set being evaluated.

The incomplete change data scheduler 338, builds a refresh schedule across content items having incomplete change data. The incomplete change data scheduler 338 may follow method 400, described subsequently, to build the refresh schedule. Once built, the refresh schedule may be output to the crawler 344 for execution. In other words, the crawler 344 will use the refresh schedule built by the incomplete change data scheduler 338 to refresh content over a time horizon.

A content item is said to have complete change data if nearly instantaneous change notifications are received whenever the content item changes; otherwise it is said to have incomplete change data. Change data may be obtained by leveraging signals from users visiting different content. For example, a browser may provide webpage information, such as a page hash, to a change analysis component. Web sites that are frequently visited may generate substantially complete change data provided via the browsers of the many visitors. A threshold may be used to determine what level of change information is needed to classify an item as having complete change information. The threshold may take both the analysis frequency and historical change frequency into account. Any content that does not satisfy the complete-change threshold is classified as incomplete.

The complete change data scheduler 340, builds a refresh schedule across content items having complete change data. The complete change data scheduler 340 may follow method 500, described subsequently, to build the refresh schedule. Once built, the refresh schedule may be output to the crawler 344 for execution. In other words, the crawler 344 will use the refresh schedule built by the complete change data scheduler 340 to refresh content over a planning horizon. A criterion for determining whether a content item has complete change data has been described previously.

The hybrid scheduler 342, builds a refresh schedule across content items having both complete change data and incomplete change data. The hybrid scheduler 342 may follow method 600, described subsequently, to build the refresh schedule. Once built, the refresh schedule may be output to the crawler 344 for execution. In other words, the crawler 344 will use the refresh schedule built by the hybrid scheduler 342 to refresh content over a time horizon. A criterion for determining whether a content item has complete or incomplete change data has been described previously.

The crawler 344 comprises one or more web crawlers responsible for keeping a set of content items fresh. The crawler 344 is typically associated with a tracker, such as a search engine. The crawler 344 receives refresh schedules and follows them. The crawler 344 may collect other data describing its refresh efforts. For example, the crawler 344 may make a record of every content item visited, the time of visit, and whether the content item had changed or not at the time of visit. This information may be used to provide an updated change rate estimate.

The content cache 346 stores copies of content items retrieved by the crawler 344. The copies may not be exact. For example, meta data or other information from the content may be optionally omitted from the cache. The cache 346 may help a search engine quickly retrieve content items or information derived from content items in the case of search results.

Figure 4:
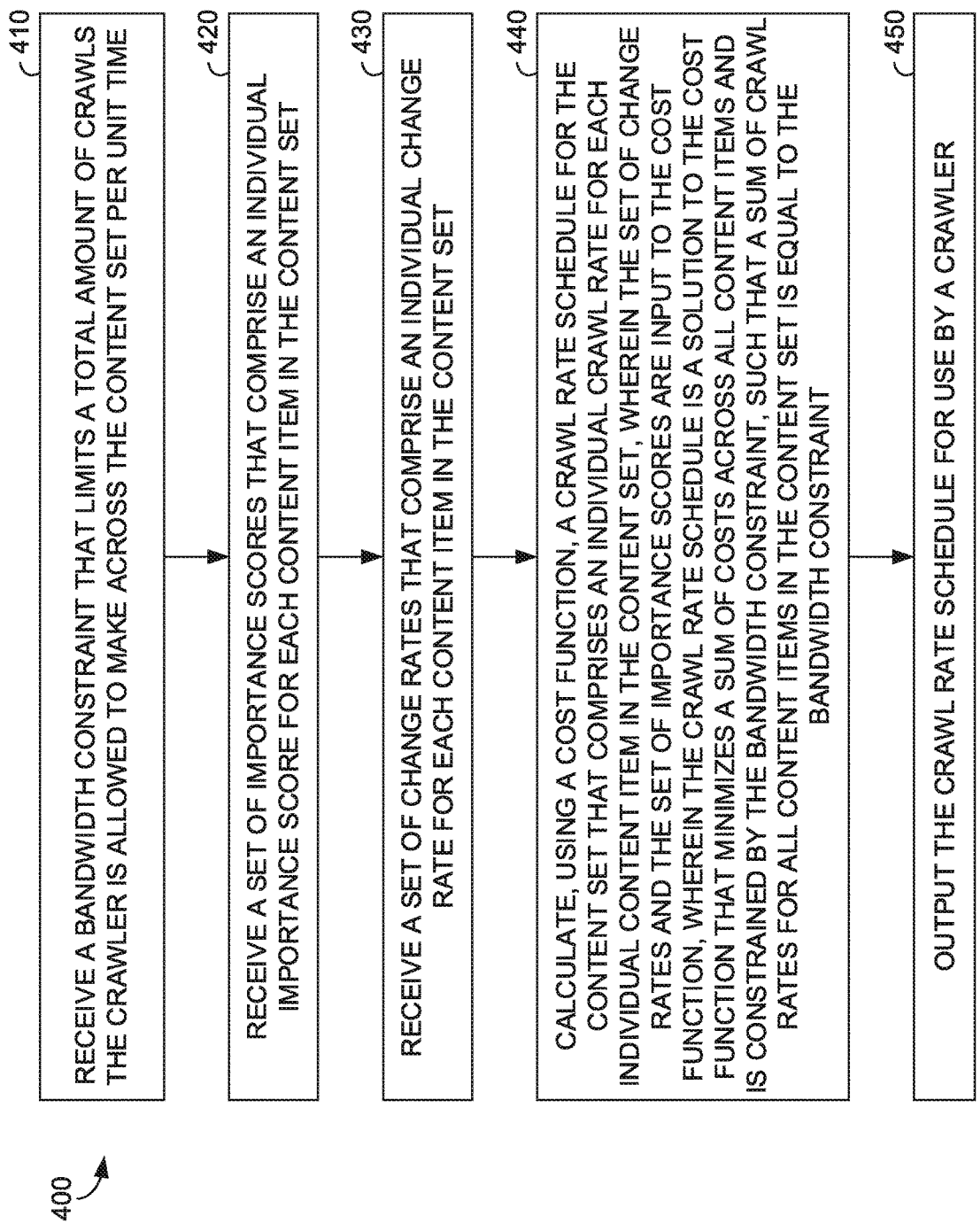
FIG. 4 is a flow diagram that illustrates a method for preparing a schedule for a crawler to follow when seeking updated copies of content items, in accordance with aspects of the technology described herein.

Turning now to FIG. 4, a flow chart showing a method 400 for preparing a schedule for a crawler to follow when seeking updated copies of content items in a content set is provided, in accordance with aspects of the technology described herein. Method 400 may be performed by search server or other computer components, as described previously. Method 400 is suitable for preparing a schedule to crawl content items having incomplete change information.

At step 410, a bandwidth constraint is received that limits a total amount of crawls the crawler is allowed to make across the content set in a fixed unit of time (e.g., an hour or a day). The bandwidth constraint can have two components. The first component is a crawler constraint. The second component is a host constraint, sometimes referred to as a politeness constraint. The crawler constraint may be thought of as a bottleneck created by the combination of hardware and software involved in the refresh process. The specific bottleneck could be limited to a network bandwidth, a processor bandwidth, a memory bandwidth, software constraints, or some other system limitation that allows for so many crawl events per unit of time. The crawler constraint could be a virtual constraint. For example, even though more network resources are available in theory, in reality a subset of these available resources are designated for use by a particular crawler. For example, different crawlers associated with a tracker may have responsibility to refresh different sets of content. These crawlers may be allocated a particular amount of resources to perform these functions by a system administrator, or the like. The goal of the refresh schedule is to maximize the freshness of content with whatever bandwidth constraint is in place. In some aspects, only the crawler constraint is considered when building the optimized refresh schedule.

The second constraint is a content-host imposed constraint. Some hosts may limit the number of times a crawler can access a content host in a fixed unit of time (e.g., an hour or a day). This constraint may apply to a collection of content items having a common content host. In other words, the limitation may not be per item, but across a collection of items. A refresh schedule that does not consider the host-imposed constraint may not utilize all available bandwidth as some crawling efforts would be directed at ultimately inaccessible content items. Further, content items could go stale for long periods if available crawl events were used up early in the planning horizon. The overall freshness can be maximized by distributing these limited crawl events more evenly.

At step 420, a set of importance scores is received that comprises an individual importance score for each content item in the content set. The importance score assigned to a content item can take many forms and can be built taking various characteristics as input. For example, a spam score can be an input to the importance score calculation. Web traffic to a content item can be an input to the importance score with sites having high traffic being more important. A click-through rate on search results can be another factor with a high click-through rate resulting in a higher importance score. Similarly, a higher frequency of queries to which a given content item is relevant can result in a higher importance score. In one aspect, various content items are already assigned an importance score (even if not called an importance score) by a search engine or other tracker, and this score may be used by aspects of the technology either as the importance score or as a component of a new score. In one method, the different factors are given different weights to produce the importance score. In an aspect, the importance score is greater than zero, as using zero within the cost function would result in zero cost for not visiting the content item. Zero cost would likely result in zero scheduled crawls for the item, which is inconsistent with a goal of the technology described herein. If a content item should not be refreshed, it would better to exclude it from the content set being evaluated.

At step 430, a set of change rates is received that comprises an individual change rate for each content item in the content set. The change rates are estimated change rates based on previous observations of the content item. Different estimators may be used, as described previously with reference to FIG. 3, but the general assumption is that change rates in the future will be similar to previously observed change rates. The change observations can be taken from crawl events and change telemetry. When a crawl event occurs, the crawler determines whether the content has changed since the last crawl event. Both crawl events are associated with a time. These times in the indication of whether a change occurred can be used to estimate a change rate. Aspects of the technology may calculate an estimated change rate by assuming that changes are evenly distributed over time. The change rates could also be based on changed telemetry received from users or other sources. This change telemetry could be evaluated by a change notification component 332 to determine whether a meaningful change occurred. Meaningful changes can be used to calculate an estimated change rate. For example, the change rate may be generated by the change frequency determiner 334 described previously.

At step 440, a crawl rate schedule for the content set that comprises an individual crawl rate for each individual content item in the content set is calculated using a cost function. The set of change rates and the set of importance scores are inputs to the cost function. The crawl rate schedule is a solution to the cost function that minimizes a sum of costs across all content items and is constrained by the bandwidth constraint, such that a sum of crawl rates for all content items in the content set is equal to the bandwidth constraint.

The cost function may be expressed as:

$$J^{\pi} = -\sum_{w \in W^-} -\mu_w \ln\left(\frac{\rho_w}{\Delta_w + \rho_w}\right) \quad (2)$$

Where $J^{\pi}$ is the cost penalty of refresh policy $\pi$;

where $W^-$ is the content set comprising content items with incomplete change information and $w$ is an individual content item in the content set;

$\rho_w$ = a crawl rate for an individual content item;

$\Delta_w$ = an estimated change rate for an individual content item; and $\mu_w$ = an importance score for an individual content item.

In one aspect, the Lagrange multiplier method is used to solve the cost function in equation 2. In this implementation, the optimal refresh plan may be expressed as the following system of equations.

$$\begin{cases} \rho_w = \dfrac{-\Delta_w + \sqrt{\Delta_w^2 + \dfrac{4\mu_w \Delta_w}{\lambda}}}{2}, \text{ for all } w \in W^- \\ \sum_{w \in W^-} \rho_w = R \end{cases} \quad (3)$$

where R is the bandwidth constraint; and $\lambda$ is the Lagrange multiplier.

The Lagrange multiplier can be calculated by the bisection search method or some other mechanism. In one aspect, a test Lagrange multiplier is selected and the equation system solved. If the sum of crawl rates for all items in the set exceeds the bandwidth constraint then the process is repeated with a higher test Lagrange multiplier. Otherwise, if the sum of crawl rates for all items in the set falls short of the bandwidth constraint then the process is repeated with a lower Lagrange multiplier. In this way, the optimal Lagrange multiplier is iteratively determined.

Further, assuming that neither the change rate nor the importance score is zero, some cost will be calculated for not visiting a content item using the equation system shown.

At step 450, the crawl rate schedule is output for use by the crawler. The crawl rate schedule can take the form of a crawl rate vector where a crawl rate is specified for each content item in the content set. A crawler can then be used to execute the crawl rate schedule and retrieve fresh content. The fresh content could be added to a cache. Data gathered during the executed crawl rate schedule can be collected and used to improve the change rate of different items. A new crawl rate schedule can then be generated, further optimizing the crawl schedule.

Figure 5:
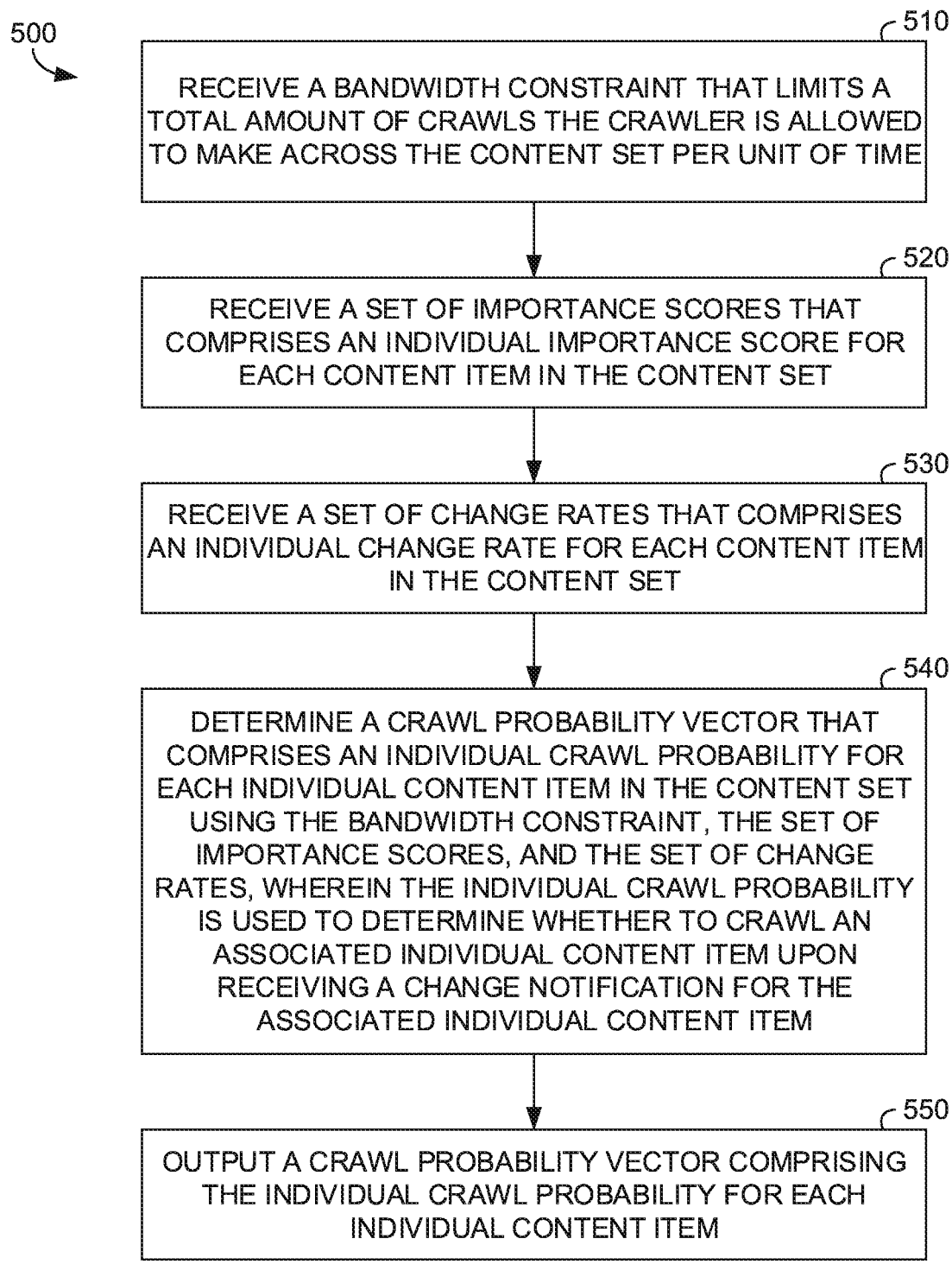
FIG. 5 is a flow diagram that illustrates a method for preparing a crawl probability vector for a crawler to follow when seeking updated copies of content items, in accordance with aspects of the technology described herein.

Turning now to FIG. 5, a flow chart showing a method 500 for preparing a schedule for a crawler to follow when seeking updated copies of content items in a content set is provided, in accordance with aspects of the technology described herein. Method 500 may be performed by search server 206 or other computer components, as described previously. Method 500 is suitable for preparing a schedule to crawl content items having complete change information.

At step 510, a bandwidth constraint is received that limits a total amount of crawls the crawler is allowed to make across the content set per unit of time. The bandwidth constraint can have two components. The first component is a crawler constraint. The second component is a host constraint, sometimes referred to as a politeness constraint. These bandwidth constraints have been described previously, for example, with reference to FIG. 4.

At step 520, a set of importance scores is received that comprises an individual importance score for each content item in the content set. The importance score assigned to a content item can take many forms and can be built taking various characteristics as input. Importance scores have been described previously, for example, with reference to FIG. 4.

At step 530, a set of change rates is received that comprises an individual change rate for each content item in the content set. The change rates are estimated change rates based on previous observations of the content item. Different estimators may be used, as described previously with reference to FIG. 3, but the general assumption is that change rates in the future will be similar to previously observed change rates. The change observations can be derived from crawl events and change telemetry. Change rates have been described previously, for example, with reference to FIG. 4.

At step 540, a crawl probability vector is determined that comprises an individual crawl probability for each individual content item in the content set using the bandwidth constraint, the set of importance scores, and the set of change rates. The individual crawl probability is used to determine whether to crawl an associated individual content item upon receiving a change notification for the associated individual content item. In other words, the system may not crawl every content item every time a change notification is received. Instead, a crawl probability is used to determine whether to visit the site, with different probability values translating to different values of the cost function. Conceptually, this can be imagined as flipping a coin to determine whether to visit the site when a change notification is received. Instead of the 50% probability associated with flipping a coin, the crawl probability calculated for the item would be used to make the crawl or no crawl decision. For example, a random number generator could be used to generate a number between 1 and 100 every time a change notification is received for a content item. A 0.6 crawl probability could be implemented by crawling the content item when the randomly generated number is less than or equal to 60.

In one aspect, the cost function used to determine the crawl probability is $$J^\pi = -\Sigma_{w \in W^\circ} \mu_w \ln\left(\frac{\rho_w}{\Delta_w + \rho_w}\right) \quad (4)$$

where $W^\circ$ is the content set comprising content items with complete change information, w is an individual content item in the content set, $p_w$ is item w's refresh (crawl) probability upon receiving a change notification, and $u_w$ is its importance score.

Under any refresh policy, the crawl rate of any content item is related to its change rate. Every time a change observation is received, a crawl will occur with crawl probability $p_w$. Thus, the crawl rate for a content item is the product of the item's crawl probability and change rate. The probability is expressed as a number between 0 and 1. Also, a bandwidth greater than the overall change rate of all items in the content set will not provide a benefit since this would result in more crawls than changes. Given these inputs, the following system can be used to calculate the optimal fresh schedule:

$$\bar{J}^\pi = -J^\pi - \sum_{w \in W^\circ} \mu_w \ln\left(\frac{\rho_w}{\Delta_w + \rho_w}\right) \quad (5)$$

subject to $$\sum_{w \in W^\circ} \rho_w \Delta_w = R, \, 0 \leq 1 \text{ for all } w \in W^\circ \quad (6)$$

Solving Equation 5 requires non-linear optimization under inequality constraints, which, in general, could take time exponential to the constraint number. If inequality constraints are ignored the solution can be expressed as:

$$\hat{p}_w^* = \frac{R\mu_w}{\Delta_w \Sigma_{w' \in W^\circ} \mu_{w'}} \text{ for all } w \in W^\circ \quad (7)$$

In this example, $\hat{p}^*_w$ represents the crawl probability for a content item. Equation 6 indicates that the relaxation's solution never has a probability less than 1, but it may indeed violate the constraints by having a probability greater than 1. The main difficulty of inequality-constrained optimization is exactly in determining the subset of inequality constraints that are active under the optimal solution, i.e., in this case, finding all content items w for which the optimal probability is 1. These content items can be found iteratively. Whenever an individual content item is calculated via equation 7 to have a greater probability than 1, then it is assigned a probability of 1 and set aside. The available bandwidth is then reduced by the estimated change rate of the item and the process is repeated for the remaining items. In this way, all content items are assigned a value greater than zero, but less than 1.

At step 550, a crawl probability vector comprising the individual crawl probability for each individual content item is output for use by the crawler. The probability vector can take the form of a crawl probability vector where a crawl probability is specified for each content item in the content set. A crawler can then be used to execute the crawl probability vector by crawling content items with corresponding probabilities when change notifications arrive and thereby retrieve fresh content. The fresh content could be added to a cache. Data gathered during the executed crawl rate schedule can be collected and used to improve the change rate of different items. A new crawl probability vector can then be generated, further optimizing the crawl schedule.

Figure 6:
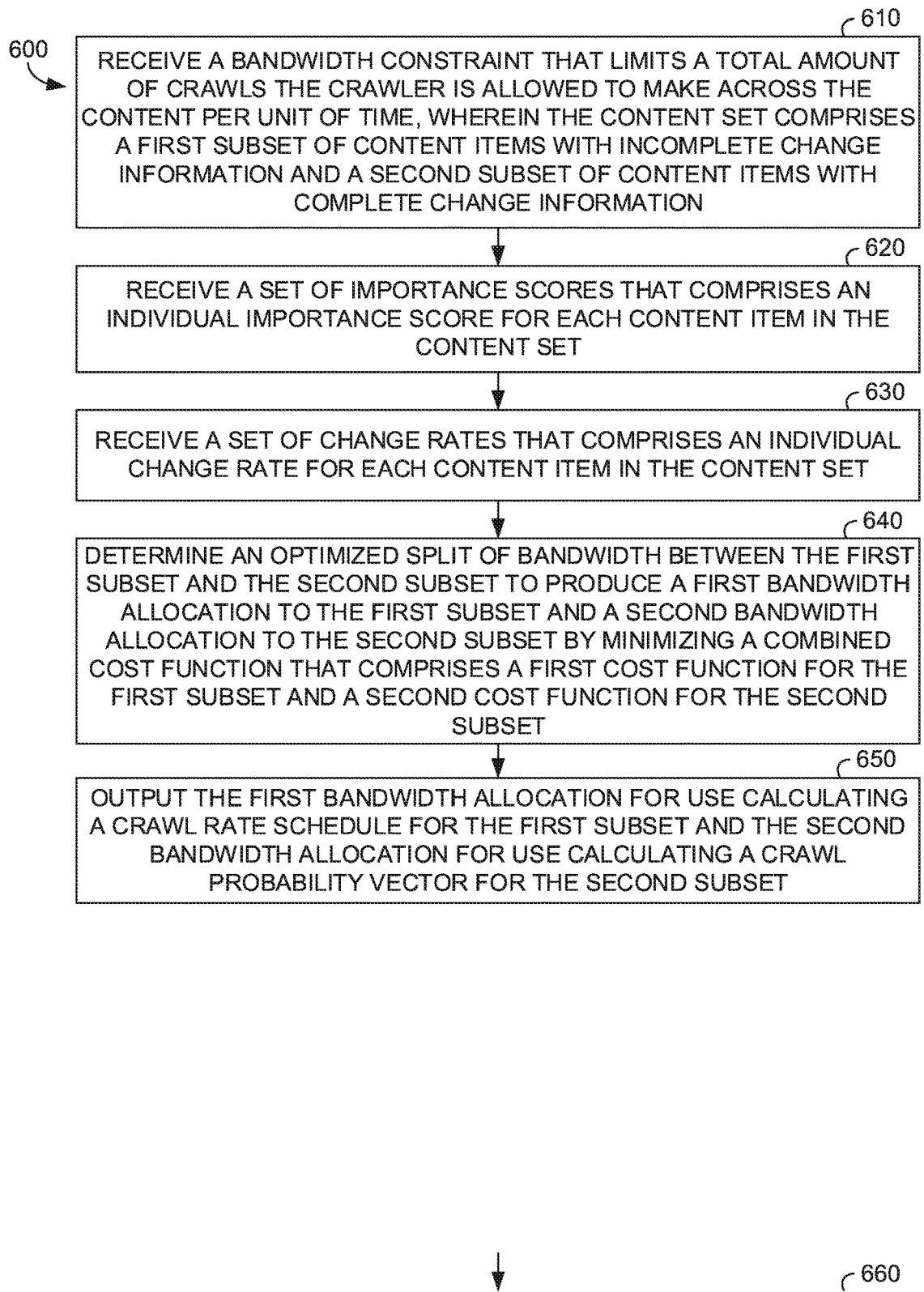
FIG. 6 is a flow diagram that illustrates a method for preparing a schedule for a crawler to follow when seeking updated copies of content items, in accordance with aspects of the technology described herein.

Turning now to FIG. 6, a flow chart showing a method 600 for preparing a schedule for a crawler to follow when seeking updated copies of content items in a content set is provided, in accordance with aspects of the technology described herein. Preparing the schedule can include determining an optimal split of available crawl bandwidth between a first set of content items having incomplete change data and a second set of content items having complete change data.

At step 610, a bandwidth constraint is received that limits a total amount of crawls the crawler is allowed to make across the content set per unit of time. The content set comprises a first subset of content items with incomplete change information and a second subset of content items with complete change information. A content item has complete change data when nearly instantaneous change notifications are received when the content item changes, otherwise it has incomplete change data. Change data may be obtained by leveraging signals from users visiting different content. For example, a browser may provide webpage information, such as a page hash, to a change analysis component. Web sites that are frequently visited may have substantially complete change data provided by the browsers of the many visitors. A threshold may be used to determine what level of change information is needed to classify an item as having complete change information. The threshold may take both the analysis frequency and historical change frequency into account. Any content that does not satisfy the complete-change threshold is classified as incomplete.

The bandwidth constraint can have two components. The first component is a crawler constraint. The second component is a host constraint, sometimes referred to as a politeness constraint. These bandwidth constraints have been described previously, for example, with reference to FIG. 4.

At step 620, a set of importance scores is received that comprises an individual importance score for each content item in the content set. The importance score assigned to a content item can take many forms and can be built taking various characteristics as input. Importance scores have been described previously, for example, with reference to FIG. 4.

At step 630, a set of change rates is received that comprises an individual change rate for each content item in the content set. The change rates are estimated change rates based on previous observations of the content item. Different estimators may be used, but the general assumption is that change rates in the future will be similar to previously observed change rates. The change observations can be derived from crawl events and change telemetry. Change rates have been described previously, for example, with reference to FIG. 4.

At step 640, an optimized split of available crawl bandwidth between the first subset and the second subset is determined. The available crawl bandwidth can be defined by the bandwidth constraint of step 610. The end result of the optimized split can be a first bandwidth allocation to the first subset and a second bandwidth allocation to the second subset. The optimized split can be determined by minimizing a combined cost function that comprises a first cost function for the first subset and a second cost function for the second subset. The first and second cost functions are different from each other. This requires combining the first cost function and second cost function into a single cost function that can be solved together, as shown:

$$J^\pi = -\Sigma_{w \in W^-} \mu_w \ln\left(\frac{\rho_w}{\Delta_w + \rho_w}\right) - \Sigma_{w \in W^\circ} \mu_w \ln(p_w) \quad (8)$$

This can be restated as follows:

$$\overline{J}^\pi = -J^\pi - \sum_{w \in W^-} \mu_w \ln\left(\frac{\rho_w}{\Delta_w + \rho_w}\right) + \sum_{w \in W^\circ} \mu_w \ln(p_w) \quad (9)$$

subject to $$\sum_{w \in W^\circ} \rho_w \Delta_w = R, \; 0 \le 1 \text{ for all } w \in W^\circ \quad (10)$$

and $$p_w > 0 \text{ for all } w \in W^-, \\ 0 < p_w \le 1 \text{ for all } w \in W^\circ \quad (11)$$

The optimization objective (Equation 9) is strictly concave as a sum of concave functions over the region described by the constraints, and therefore has a unique maximizer. To find the maximizer efficiently, we observe that solving Equation 9 amounts to deciding how to split the global bandwidth constraint R into an allotment $R^\circ$ for content with complete change observations and $R^-=R-R^\circ$ for the rest. The optimal split can be efficiently found numerically by iteratively guessing a split, evaluating the split by summing the costs calculated by the first cost function and the second cost function, and generating a next guess split that improves on the value of the previous one.

The iterative approach can involve repeating the following steps until an optimized solution is found. The first step is to receive or generate a test split of bandwidth comprising a first test bandwidth for the first content set and a second test bandwidth for the second content set. Each iteration will have a different test split. Next, a first optimized schedule for the first subset of content items is calculated using the method described in FIG. 4 using the first test bandwidth, the importance scores of step 620, and change rates of step 630 as input. The method of FIG. 5 may be used to calculate a first optimal probability vector using the second test bandwidth, the importance scores of step 620, and change rates of step 630 as input. The first cost function is then used to calculate a total cost of the for the first optimized test schedule. The second cost function is then used to calculate a total cost of the first optimal probability vector. The two costs are summed to generate a total cost of the first iteration. These steps are repeated for additional iterations until a minimal total cost is found. The split associated with the iteration having the lowest total cost is the optimal split.

At step 650, the first bandwidth allocation for use calculating a crawl rate schedule for the first subset and the second bandwidth allocation for use calculating the crawl probability vector for the second subset are output.

Once the optimal split is determined, the method 400 can be used to calculate the optimal crawl rate schedule for content items with incomplete change data and the method 500 can be used to determine the probability vector for content items with complete change data. The crawl rate schedule and the crawl probability vector are output for use by the crawler. The crawl rate schedule can take the form of a crawl rate vector where a crawl rate is specified for each content item in the content set. A crawler can then be used to execute the crawl rate schedule and retrieve fresh content. The fresh content could be added to a cache. Data gathered during the executed crawl rate schedule can be collected and used to improve the change rate of different items. A new crawl rate schedule can then be generated, further optimizing the crawl schedule.

The probability vector can take the form of a crawl probability vector where a crawl probability is specified for each content item in the content set. A crawler can then be used to execute the crawl probability vector and retrieve fresh content. The fresh content could be added to a cache. Data gathered during the executed crawl rate schedule can be collected and used to improve the change rate of different items. A new crawl probability vector can then be generated, further optimizing the crawl schedule.

Exemplary Computing Environment

As described with reference to FIG. 3, the technology described herein can be implemented in a distributed fashion, such that it can run over a cluster/network of computers that work together to perform the computations describes in FIGS. 1-6. In an aspect, the computing device 700 described in FIG. 7 may be one of several computers in a cluster. With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present technology. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in Illustrative components include a microphone, joystick, game pad, satellite dish, scanner, printer, wireless device, etc.

The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Turning now to FIG. 8, a flow chart showing a method 800 for preparing a probability vector a crawler to follow when seeking updated copies of content items in a content set is provided, in accordance with aspects of the technology described herein. Method 800 may be performed by search server 206 or other computer components, as described previously. Method 800 is suitable for preparing a probability vector for content items having complete change information.

At step 810, a crawl probability vector is determined that comprises an individual crawl probability for each individual content item in the content set. The individual crawl probability is used to determine whether to crawl an associated individual content item upon receiving a change notification for the associated individual content item using the bandwidth constraint, the set of importance scores, and the set of change rates. In other words, the system may not crawl every content item every time a change notification is received. Instead, a crawl probability is used to determine whether to visit the site, with different crawl probability values translating to different values of the cost function. Conceptually, this can be imagined as flipping a coin to determine whether to visit the site when a change notification is received. Instead of the 50% probability associated with flipping a coin, the crawl probability calculated for the item would be used to make the crawl or no crawl decision. For example, a random number generator could be used to generate a number between 1 and 100 every time a change notification is received for a content item. A 0.6 crawl probability could be implemented by crawling the content item when the randomly generated number is less than or equal to 60.

Different inputs may be used to determine the crawl probability. For example, a bandwidth constraint may be received that limits a total amount of crawls the crawler is allowed to make across the content set per unit of time. The bandwidth constraint can have two components. The first component is a crawler constraint. The second component is a host constraint, sometimes referred to as a politeness constraint. These bandwidth constraints have been described previously, for example, with reference to FIG. 4.

A set of importance scores may be received that comprises an individual importance score for each content item in the content set. The importance score assigned to a content item can take many forms and can be built taking various characteristics as input. Importance scores have been described previously, for example, with reference to FIG. 4.

A set of change rates is received that comprises an individual change rate for each content item in the content set. The change rates are estimated change rates based on previous observations of the content item. Different estimators may be used, as described previously with reference to FIG. 3, but the general assumption is that change rates in the future will be similar to previously observed change rates. The change observations can be derived from crawl events and change telemetry. Change rates have been described previously, for example, with reference to FIG. 4.

In one aspect, the cost function used to determine the crawl probability is $$J^\pi = -\Sigma_{w \in W^\circ} \mu_w \ln\left(\frac{\rho_w}{\Delta_w + \rho_w}\right) \quad (4)$$

where $W^\circ$ is the content set comprising content items with complete change information, w is an individual content item in the content set, $p_w$ is item w's refresh (crawl) probability upon receiving a change notification, and $mu_w$ is its importance score.

Under any refresh policy, the crawl rate of any content item is related to its change rate. Every time a change observation is received, a crawl will occur with crawl probability $p_w$. Thus, the crawl rate for a content item is the product of the item's crawl probability and change rate. The probability is expressed as a number between 0 and 1. Also, a bandwidth greater than the overall change rate of all items in the content set will not provide a benefit since this would result in more crawls than changes. Given these inputs, the following system can be used to calculate the optimal fresh schedule:

$$\bar{J}^\pi = -J^\pi - \sum_{w \in W^\circ} \mu_w \ln\left(\frac{\rho_w}{\Delta_w + \rho_w}\right) \quad (5)$$

subject to $$\sum_{w \in W^\circ} \rho_w \Delta_w = R, 0 \le 1 \text{ for all } w \in W^\circ \quad (6)$$

Solving Equation 5 requires non-linear optimization under inequality constraints, which, in general, could take time exponential to the constraint number. If inequality constraints are ignored the solution can be expressed as:

$$\hat{p}_w^* = \frac{R\mu_w}{\Delta_w \Sigma_{w' \in W^\circ} \mu_{w'}} \text{ for all } w \in W^\circ \quad (7)$$

In this example, $\hat{p}^*_w$ represents the crawl probability for a content item. Equation 6 indicates that the relaxation's solution never has a probability less than 1, but it may indeed violate the constraints by having a probability greater than 1. The main difficulty of inequality-constrained optimization is exactly in determining the subset of inequality constraints that are active under the optimal solution, i.e., in this case, finding all content items w for which the optimal probability is 1. These content items can be found iteratively. Whenever an individual content item is calculated via equation 7 to have a greater probability than 1, then it is assigned a probability of 1 and set aside. The available bandwidth is then reduced by the estimated change rate of the item and the process is repeated for the remaining items. In this way, all content items are assigned a value greater than zero, but less than 1.

At step 820, a crawl probability vector comprising the individual crawl probability for each individual content item is output for use by the crawler. The probability vector can take the form of a crawl probability vector where a crawl probability is specified for each content item in the content set. A crawler can then be used to execute the crawl probability vector by crawling content items with corresponding probabilities when change notifications arrive and thereby retrieve fresh content. The fresh content could be added to a cache. Data gathered during the executed crawl rate schedule can be collected and used to improve the change rate of different items. A new crawl probability vector can then be generated, further optimizing the crawl schedule.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. A method for updating copies of content items in a content set, the method comprising:

receiving a bandwidth constraint that limits a total amount of crawls allowed to be made across the content set per unit time, wherein the content set comprises a first subset of content items with incomplete change information and a second subset of content items with complete change information;

receiving a set of importance scores that comprises an individual importance score for each content item in the content set;

receiving a set of change rates that comprises an individual change rate for each content item in the content set;

determining an optimized split of bandwidth between the first subset and the second subset to produce a first bandwidth allocation to the first subset and a second bandwidth allocation to the second subset by minimizing a cost function that associated with the first subset and the second subset;

outputting the first bandwidth allocation for use calculating a crawl rate schedule for the first subset and the second bandwidth allocation for use calculating a crawl probability vector for the second subset;

calculating, using the first cost function, the crawl rate schedule for the first content set that comprises an individual crawl rate for each individual content item in the first content set, wherein the set of change rates and the set of importance scores are input to the first cost function, wherein the crawl rate schedule is a solution to the first cost function that minimizes a sum of costs across all content items in the first subset and is constrained by the first bandwidth allocation, such that a sum of crawl rates for all content items in the in the first subset is equal to the first bandwidth allocation; and retrieving updated copies of content items in the first subset according to the crawl rate schedule and the second subset according to the crawl probability vector.

2. The method of claim 1, wherein the bandwidth constraint comprises a crawler constraint and a host constraint, wherein the crawler constraint is defined as a first sum of crawl events the crawler is allowed to make against all content sources per unit of time, and wherein the host constraint is a second sum of crawl events allowed against an individual host content source per unit of time.

3. The method of claim 1, wherein the individual change rate is estimated based on analysis of previous crawl events against the individual content item and a determination whether the individual content item changed between crawl events.

4. The method of claim 3, wherein the first cost function is minimized using a Lagrange multiplier method.

5. The method of claim 4, wherein a Lagrange multiplier used in the Lagrange multiplier method is determined using a bisection search method.

6. The method of claim 1, wherein change information for content items in the content set is incomplete.

7. The method of claim 1, wherein the individual crawl rate for each individual content item in the content set is greater than zero.

8. A method for seeking updated copies of content items in a content set by following a crawl probability vector, the method comprising:

receiving a bandwidth constraint that limits a total amount of crawls allowed to be made across the content set per unit time, wherein the content set comprises a first subset of content items with incomplete change information and a second subset of content items with complete change information;

receiving a set of importance scores that comprises an individual importance score for each content item in the content set;

receiving a set of change rates that comprises an individual change rate for each content item in the content set;

determining an optimized split of bandwidth between the first subset and the second subset to produce a first bandwidth allocation to the first subset and a second bandwidth allocation to the second subset by minimizing a cost function that associated with the first subset and the second subset;

outputting the first bandwidth allocation for use calculating a crawl rate schedule for the first subset and the second bandwidth allocation for use calculating a crawl probability vector for the second subset;

calculating, using the second cost function, the crawl probability vector for the second subset that comprises an individual crawl rate for each individual content item in the second subset, wherein the set of change rates and the set of importance scores are input to the second cost function, wherein the crawl probability vector is a solution to the second cost function that minimizes a sum of costs across all content items in the second subset and is constrained by the second bandwidth allocation, such that a sum of crawl rates for all content items in the second subset is equal to the second bandwidth allocation; and retrieving updated copies of content items in the first subset according to the crawl probability vector and the second subset according to the crawl probability vector.

9. The method of claim 8, further comprising calculating, using the first cost function, the crawl rate schedule for the first content set that comprises an individual crawl rate for each individual content item in the first content set, wherein the set of change rates and the set of importance scores are input to the first cost function, wherein the crawl rate schedule is a solution to the first cost function that minimizes a sum of costs across all content items in the first subset and is constrained by the first bandwidth allocation, such that a sum of crawl rates for all content items in the in the first subset is equal to the first bandwidth allocation.

10. The method of claim 9, wherein the cost function is solved using a Lagrange multiplier method.

11. The method of claim 8, wherein the bandwidth constraint comprises a crawler constraint and a host constraint, wherein the crawler constraint is defined as a first sum of crawl events the crawler is allowed to make against all content sources per unit of time, and wherein the host constraint is a second sum of crawl events allowed against an individual host content source set per unit of time.

12. The method of claim 8, wherein the individual change rate is estimated based on analysis of previous crawl events against the individual content item and a determination whether the individual content item changed between crawl events.

13. One or more computer storage media that, when executed by a computing device, causes the computing device to perform a method of seeking updated copies of content items in a content set, the method comprising:

receiving a bandwidth constraint that limits a total amount of crawls the crawler is allowed to make across the content set per unit of time, wherein the content set comprises a first subset of content items with incomplete change information and a second subset of content items with complete change information;

receiving a set of importance scores that comprises an individual importance score for each content item in the content set;

receiving a set of change rates that comprises an individual change rate for each content item in the content set;

determining an optimized split of bandwidth between the first subset and the second subset to produce a first bandwidth allocation to the first subset and a second bandwidth allocation to the second subset by minimizing a cost function associated with the first subset and the second subset;

outputting the first bandwidth allocation for use calculating a crawl rate schedule for the first subset and the second bandwidth allocation for use calculating a crawl probability vector for the second subset; and retrieving updated copies of content items in the first subset according to the crawl rate schedule and the second subset according to the crawl probability vector.

14. The media of claim 13, further comprising calculating, using the second cost function for the second subset, the crawl probability vector that comprises an individual crawl probability for each individual content item in the second subset using the bandwidth constraint, the set of importance scores, and the set of change rates, wherein the individual crawl probability is used to determine whether to crawl an associated individual content item upon receiving a change notification for the associated individual content item, wherein the crawl probability vector is a solution to the second cost function that minimizes a second sum of costs across all content items in the second subset and is constrained by the bandwidth constraint, such that a second sum of crawl rates for all content items in the second subset is equal to the bandwidth constraint minus a bandwidth allocated to crawl the first subset; and outputting the crawl probability vector.

15. The media of claim 13, further comprising calculating, using the first cost function for the first subset, the crawl rate schedule for the first subset that comprises an individual crawl rate for each individual content item in the first subset of content items, wherein the set of change rates and the set of importance scores are input to the first cost function, wherein the crawl rate schedule is a solution to the first cost function that minimizes a sum of costs across all content items and is constrained by the bandwidth constraint, such that a sum of crawl rates for all content items in the first subset is equal to the first bandwidth allocation; and outputting the crawl rate schedule.

16. The media of claim 13, wherein the individual change rate is estimated based on analysis of previous crawl events against the individual content item and a determination whether the individual content item changed between crawl events.

17. The media of claim 13, wherein a first change information for the first subset of content items in the content set is incomplete and a second change information for the second subset of content items in the content set is complete.

* * * * *